United States Patent [19]
Finley et al.

[11] Patent Number: 4,836,822
[45] Date of Patent: Jun. 6, 1989

[54] COMPACT HAND-HELD THUMB ACTUATED FRICTION-TYPE TURKEY CALL

[75] Inventors: Randy Finley, Chesapeake, Ohio; Ben R. Lee, Coffeeville, Ala.

[73] Assignee: Ben Lee Calls, Coffeeville, Ala.

[21] Appl. No.: 116,836

[22] Filed: Nov. 5, 1987

[51] Int. Cl.$^4$ .............................................. A63H 5/00
[52] U.S. Cl. .................................... 446/397; 446/421; 84/410
[58] Field of Search ............... 446/397, 402, 404, 418, 446/421; 84/402, 404, 410; 43/1, 2

[56] References Cited

U.S. PATENT DOCUMENTS

| | | | |
|---|---|---|---|
| 574,534 | 1/1897 | Gibson | 446/397 |
| 1,449,756 | 3/1923 | Jackson | 446/397 |
| 1,890,288 | 12/1932 | Graf | 446/421 |
| 2,573,856 | 11/1951 | Malone, Sr. | 43/2 X |
| 3,783,733 | 1/1974 | Zirimis | 446/421 X |
| 4,041,639 | 8/1977 | Funk | 446/397 |
| 4,343,108 | 8/1982 | Lee | 446/397 |
| 4,422,262 | 12/1983 | Moss | 446/397 |
| 4,606,733 | 8/1986 | Willis | 446/397 |

Primary Examiner—Robert A. Hafer
Assistant Examiner—Sam Rimell
Attorney, Agent, or Firm—Sughrue, Mion, Zinn, Macpeak & Seas

[57] ABSTRACT

A compact hand-held thumb actuated friction-type turkey call is formed of a generally rectangular elongated hollow wooden sound box assembly having a longitudinal slot with a planar striker pivotably mounted to one end block at one end thereof for oscillation into and out of the sound chamber through the longitudinal slot. The hollow sound box assembly includes at least one sounding board oblique to an opposed face of the planar striker and extending inwardly of the sound chamber towards a striker planar surface and having a longitudinal edge contactable by the striker surface during movement of the striker into and out of the longitudinal slot. A spring biases the striker to a position partially projecting from the sound chamber. The sound box assembly may be held in the palm of one hand such that the user's thumb readily depresses the striker against the bias of the spring into the sound chamber to produce a rasping call imitating the sound of a live, wild turkey. The sound box assembly may have dual oblique sounding boards facing opposite planar surfaces of the striker with the striker laterally shiftable to rub against a selected edge of one of the sounding boards. The dual sounding boards may have different oblique angles relative to contacting surfaces of the striker to produce sounds of different pitch and volume.

10 Claims, 2 Drawing Sheets

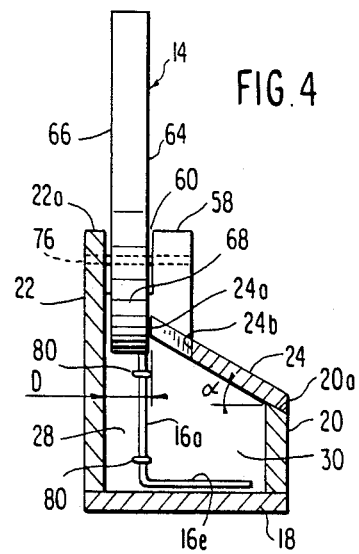
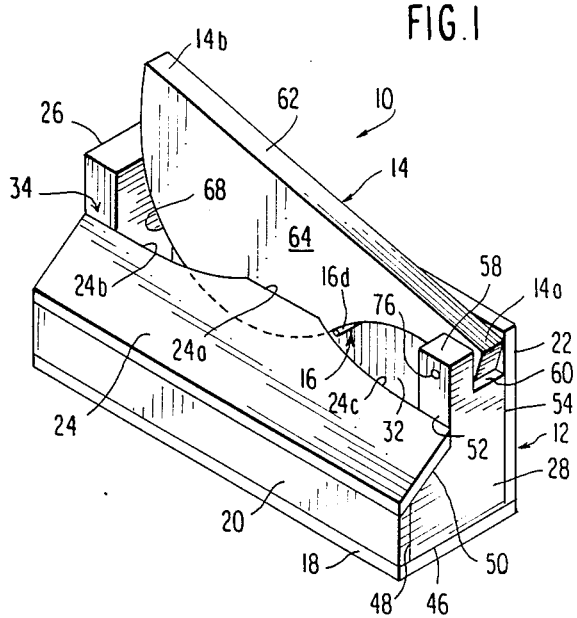
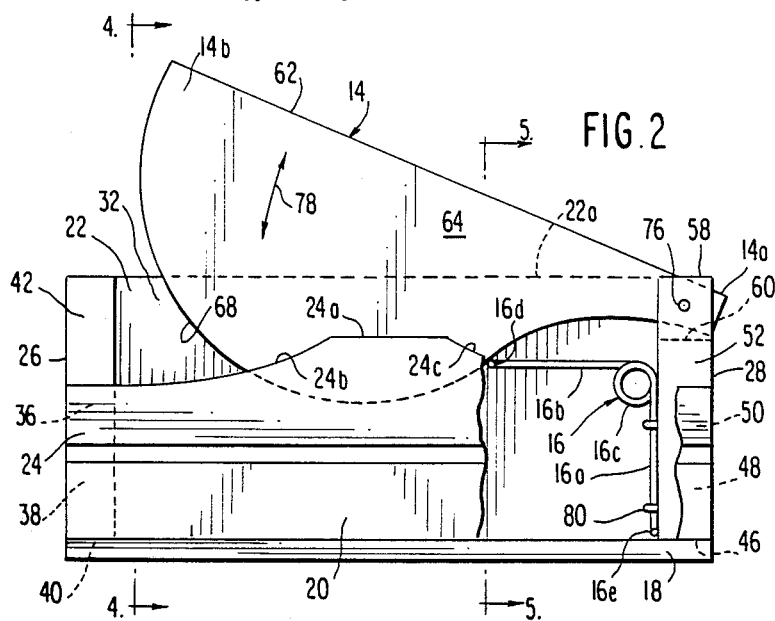
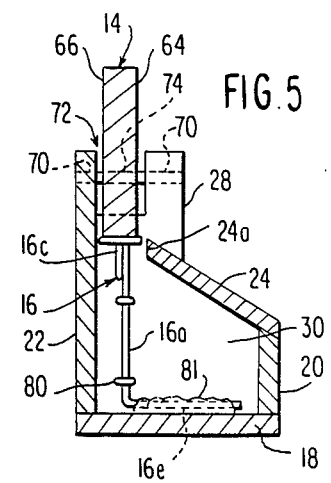
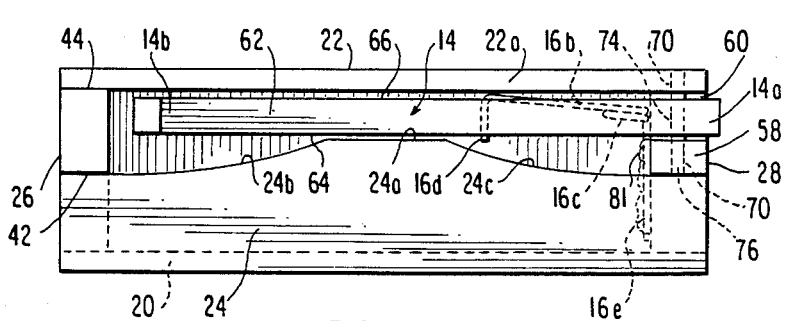
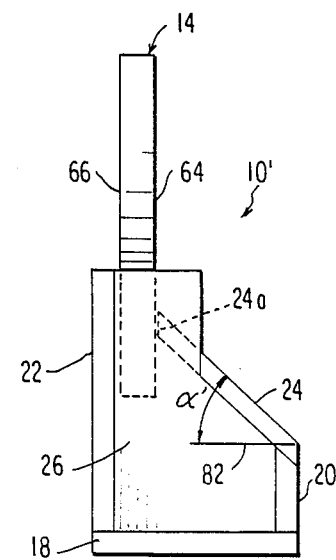

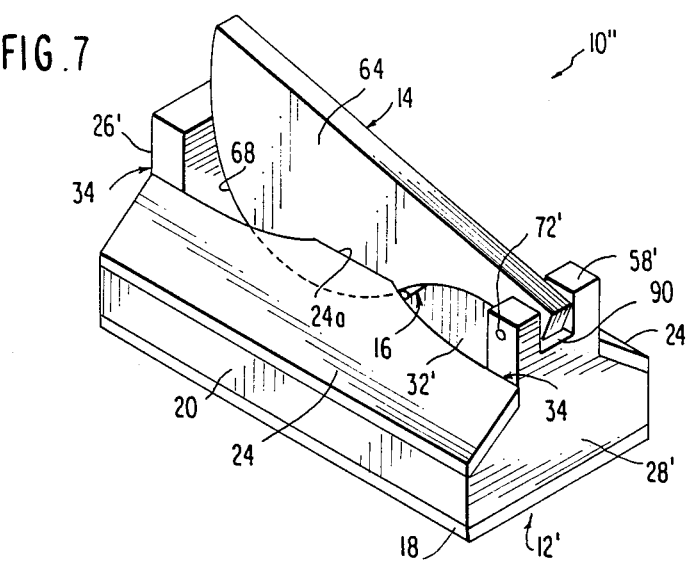
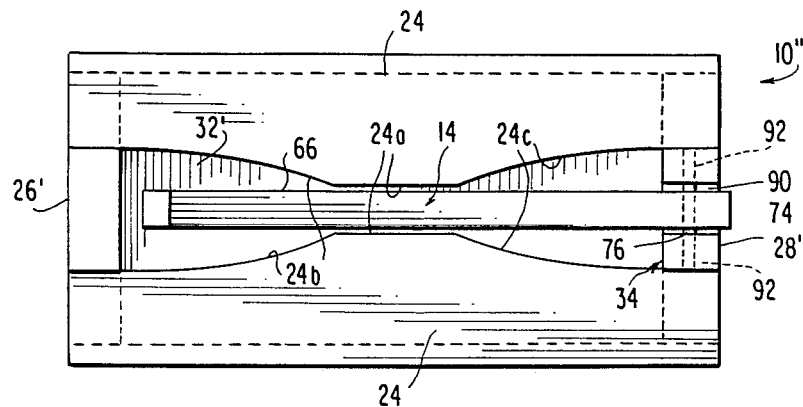
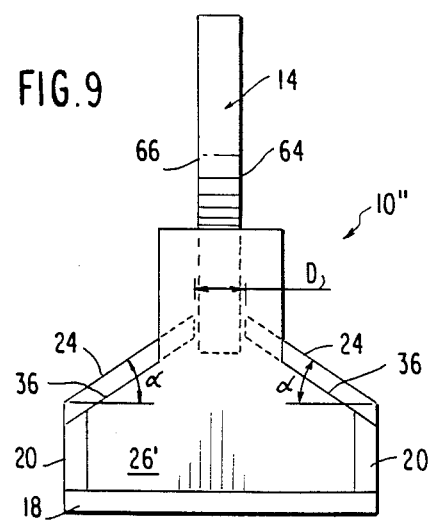
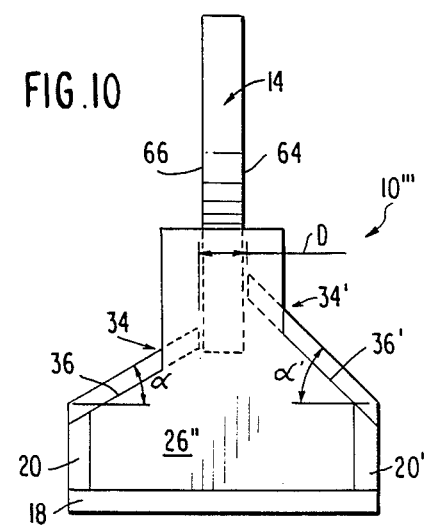

COMPACT HAND-HELD THUMB ACTUATED FRICTION-TYPE TURKEY CALL

FIELD OF THE INVENTION

This invention relates to a sound box friction-type turkey call and more particularly to such a turkey call capable of being held in one hand and actuated by the caller's thumb by depression of a striker with automatic return and capable of reproducing wild turkey yelps, purrs, clucks and the like.

BACKGROUND OF THE INVENTION

The applicant's assignee has been manufacturing and selling box friction-type turkey calls made principally of wood taking the form of a upwardly open elongated wooden box and bearing a sounding board within and partially defining a sound chamber. The open top is covered by a thin wooden actuator which is pivoted for rotation about a pivot axis at one end thereof and wherein, either a single or double convex bottom surface of the actuator engages the convex edge of one or more vertical sounding board to provide either single tone or double tone reproduction of an actual wild turkey call.

Representative of such sound box friction-type turkey calls is that set forth in U.S. Pat. No. 4,343,108. While such turkey call produces an excellent sound, duplicating that of both a hen turkey and the male gobbler, such calls require normally, one hand to hold the upwardly open box and the other to physically sweep the single double convex bottom surface of the thin wooden actuator across the convex edges of the sound boards thereof to produce the simulated turkey call.

It is thereof a primary object to produce a new friction-type turkey call of the box, friction type for easy, one handed use, requiring a minimum of motion, automatically returning a striker moved to create the desired sound which is highly efficient, which is small enough to be readily stored in the user's pocket and which permits reproduction of turkey calls consisting of multiple notes and which, permits the operator to readily vary the rhythm, pitch and volume of the sound.

SUMMARY OF THE INVENTION

The compact, single hand held thumb actuated friction type turkey call of the present invention consists of three main elements, a sound box, a striker and a return spring. A generally rectangular, elongated hollow wooden sound box assembly forms an internal sound chamber and is provided with a longitudinal slot extending lengthwise thereof, opening to the chamber. A planar striker is mounted for movement within the slot so as to partially project into and out of the slot and has laterally opposed side faces. The hollow sound box includes a sounding board which is oblique to an opposed side face of the striker and extends inwardly of the chamber towards the striker face and has a longitudinal edge contactable by the striker face during movement of the striker as the striker is moved into and out of the slot. Means bias the striker to a rest position partially projecting outwardly of the chamber whereby manual depression of the striker in contact with the sounding board edge causes a rasping sound to be developed within the sound chamber closely imitating the call of a live wild turkey.

The hollow wooden sound box assembly may comprise a horizontal base, laterally opposed vertical front and rear walls extending along opposite sides of the base and parallel to each other, and opposed end blocks at opposite ends of the sound box assembly. The striker has one end pivoted to one end block for oscillation about a pivot axis perpendicular to the longitudinal axis of the slot and a return spring positioned within the sound box and contacting an edge of the striker projecting through the slot and into the sound chamber for biasing said striker to a position partially projecting outside of the sound box and outwardly of the longitudinal slot. The return spring may be a coiled wire spring having one leg stapled to the end block to which the striker is pivoted and a second leg at right angles thereto having a terminal portion in contact with the edge of the striker facing the sound chamber. The oblique sounding board is preferably fixed to an edge of the front wall remote from the base. The rear wall opposite the front wall bearing the oblique sounding board may be of a height in excess of the combined height of the front wall and the oblique sounding board and spaced from a tapered edge of the sounding board proximate to the striker, by a distance which is slightly in excess of the width of the striker. The striker is loosely pivoted to the end block such that the striker can shift laterally relative to the rear wall and the edge of the sounding board proximate thereto to facilitate a variance in the tone, pitch and volume of the sound produced by rubbing contact of the striker face with the edge of the sounding board.

Preferably, the edge of the sounding board proximate to the striker is cut away from the striker at each end thereof such that contact between the striker and the edge of the sounding board is limited to the center of the sounding board edge thereby enlarging the longitudinal slot near the opposite ends thereof to improve the sound production of the call sounds of a wild turkey.

The sounding board may be at a shallow acute angle relative to the base thereby producing a low pitch sound or at a relatively steep acute angle to produce a higher pitch sound. The sound box assembly may include diagonally opposite dual sounding boards extending inwardly from both the front and rear thereof, defining at the free edges thereof, the longitudinal slot opening to the sound chamber within which the striker moves. The oblique angulation of the sound boards may be the same or different to produce varying pitch and volume sounds depending upon which of the opposed sides faces of the striker rubs a respective edge of the dual sounding boards.

BRIEF DESCRIPTION OF THE DRAWINGS

FIG. 1 is a perspective view of a friction box-type turkey call forming one embodiment of the invention;

FIG. 2 is a side elevational view, partially broken away of the turkey call of FIG. 1;

FIG. 3 is a top plan view of the turkey call of FIGS. 1 and 2;

FIG. 4 is a vertical sectional view of the turkey call of FIG. 2 taken about line 4—4;

FIG. 5 is a vertical sectional view of the turkey call of FIG. 2 taken about line 5—5;

FIG. 6 is a end view of a turkey call similar to that of FIGS. 1-5 inclusive showing a steeper angle for the sounding board and forming a further embodiment of the invention;

FIG. 7 is a perspective view of a friction box-type turkey call having two oppositely oblique sounding boards and forming yet another embodiment of the present invention;

FIG. 8 is a top plan view of the turkey call of FIG. 7;

FIG. 9 is an end elevational view of the turkey call shown in FIGS. 7 and 8;

FIG. 10 is an end elevational view of a variant of the turkey call shown in FIGS. 7-9 with the dual sounding boards at different oblique angles and forming yet another embodiment of the present invention.

DESCRIPTION OF THE PREFERRED EMBODIMENTS

Referring to FIGS. 1-5 inclusive, a first embodiment of the present invention, the hand-held thumb actuated, friction box-type turkey call indicated generally at 10 consist of three principal components, a generally rectangular, elongated hollow wooden sound box assembly indicated generally at 12, a pivotable, planar striker 14 and a return spring 16. From FIGS. 1-5 inclusive, the sound box assembly 12 consist, in this embodiment, of a base 18, a front wall 20, a rear wall or solid back panel 22, a sounding board 24 which is fixably mounted to the upper end of the front wall 20 and extends upwardly and oblique towards the solid back panel or rear wall 22 and a pair of longitudinally spaced opposed end blocks 26, 28. Members 18, 20, 22, 24, 26 and 28 are preferably formed of wood, glued together, and forming a hollow enclosure defining an interior sound chamber 30 which opens to the outside via a narrow longitudinal slot or opening 32 between the back panel 22 and oblique edge 24a of the sound board 24. The base 18 is of rectangular form as is the solid back panel 22 and the front wall 20, the solid back panel and the front wall being at right angles to the base, glued or otherwise fixed thereto at the lower end thereof and extending along opposite longitudinal sides of base 18. The front wall 20 has an upper edge 20a which is beveled or oblique at a predefined angle forming an acute angle α with respect to the base 18. Due to this angulation of the upper edge 20a of the front wall 20, the sounding board which is of irregular rectangular plan form, extends obliquely upwardly and rearwardly towards the back panel 22. The edge 24a of the sounding board which faces the back panel 22 is generally vertical extending parallel to the interior surface of the back panel 22 and being separated therefrom by a distance or gap D. End blocks 26, 28 are mirror images of each other being of a height generally equal to that of the back panel 22 having vertical side edges which lie flush to and are preferably glued to the interior surfaces of the front wall 20 and the back panel 22. Each of the end blocks is recessed at 34 to facilitate mounting of the sounding board 24 at the correct oblique, acute angle. In that respect, end block 26 includes an oblique edge 36 which extends from a vertical side edge 38 at an acute angle α wit respect to its lower edge 40 in contact with base 18, the edge 36 terminating in a vertical edge 42 which is parallel to the opposite side edge 44 of the end block. The sounding board 24 is likewise glued to the upper edge of the front wall and at opposite ends to the oblique edges of respective end blocks 26, 28. End block 28 in mirror image fashion, includes a horizontal lower edge 46 abutting the upper surface of base 18, a vertical side edge 48 abutting the interior surface of front wall 20, an oblique edge 50 at recess 34 matching the surface edge 36 of end block 26 which, intersects a further vertical side edge 52 which is exposed. A vertical side edge 54 opposite that at 48, extends the full height of end block 28 and abuts the solid back panel or rear wall 22 resting on base 18. The mating surfaces of the end blocks, the base, the front wall, rear wall and sounding board are glued together in the illustrated embodiment defining a sealed sound chamber 30 with the exception of the elongated slot 32.

End wall 28 includes a rectangular notch 60 within the top face 58 thereof to the side proximate the back panel or rear wall 22. Notch 58 facilitates hinging of striker 14 to upright end wall 28. The striker 14 which is also preferably formed of wood, is of half moon configuration, is of elongated, planar form, consisting of a flat upper edge 62, a flat side face 64 which makes surface contact with edge 24a of sounding board 24 and which opposes that edge and an opposite flat side face 66 which opposes the back panel or rear wall 22 and an arcuate lower edge 68. The arcuate, lower edge 68 is of S-shaped configuration. One end 14a of the striker 14, proximate to end block 28, is considerably shorter in vertical height than end 14b proximate to the end block 26. The shorter end 14a is of a vertical height which is less than that of notch 60 and is positioned within the notch 60. Further, aligned holes 70 are drilled through the end block 28, and the back panel or rear wall 22, while a similar diameter hole 74 is provided within the shortened end 14 a of the striker. Hinge pin 76 projects through the aligned holes 70, and 74 forming hinge 72 to pivot the striker to end block 28 for rotation about a horizontal axis for oscillation as indicated by arrow 78, FIG. 2. The overall length of the striker is such that the striker may be depressed or rotated about the pivot axis defined by hinged pin 76 to a position where, the curved lower edge 68 of the striker contacts the upper surface of base 18 and with the striker 14 fully projected within sound chamber 30. In this position, the flatted edge 62 of the striker lies generally flush with the upper edge 22a of the back panel or rear wall 22.

It is preferred, that edge 24a of the sounding board facing and in contact with face 64 of the striker be scalloped to each side of the center as at 24b, 24c, respectively, thereby widening the slot 32 at opposite ends.

The hinge 72 for the striker is preferably one that provides a loose fit so that the striker 14 can shift to some degree side to side, that is wobble slightly, to insure controlled edge contact between face 64 of the striker and contact edge 24a of the sounding board.

The third major component of the turkey call is the return spring 16. The spring 16 is formed of a metal spring wire. The spring 16 is required, in the form shown, to have a mounting leg 16a and a free leg 16b integrally joined by a loop or coil 16c with the mounting leg 16a being vertically positioned and preferably mounted against the inside surface of end block 28 to which the striker is hinged. Mounting is fixably accomplished by a pair of U-shaped metal staples 80 penetrating the end block 28. The free leg 16b underlies the bottom edge 68 of striker 14. As seen in FIG. 5, the mounting leg 16a also lies beneath the arcuate bottom edge 68 of the striker 14. Preferably, the free leg includes a right angle terminal portion 16d which extends the full width of the striker 14 to insure contact with the bottom edge 68 of the striker, and may be of such a length, that it impinges against the bottom surface of the sounding board 24 to limit the biasing action against the striker tending to cause the striker to project outwardly of the sound chamber 30 to the extent shown in FIGS. 1 and 2. Further, leg 16a at its lower end includes a right angle projecting terminal portion 16e which extends nearly the full width of the sound chamber 30, further stabilizing the position of the return spring 16. As illustrated, a dab of glue 81 may be applied to the full length of the terminal portion 16e of the mounting leg 16a to assist in rigidly mounting and maintaining the position of mounting leg 16a of the return spring.

The friction, box-type turkey call is purposely designed for easy, one-handed use requiring a minimum of striker motion, but providing a high efficiency in the reproduction of a variation of wild turkey calls such as yelps, purrs, clucks, etc.

In operation, the user's thumb (not shown) extends along the upper edge 62 of the striker 14 with the box assembly 12 cradled in the user's palm and extending parallel to the thumb. Flexing of the thumb pushes the striker 14 down and towards the sounding board 24 making contact along the center portion of the edge 24a. The contact with the sounding board on the body of the call thus permits a variety of rasping sound calls imitating a wild turkey to be generated within the sound chamber 30. The return spring 16 attached to the sound chamber 30 internal wall of end block 28 functions to return the striker 14 to its original position, that is the partially projected from the sound chamber 30, as shown. This allows multiple notes to be produced when making the desired call or calls. With a minimum of practice and by use of either the left of right hand, the user can vary the rhythm, pitch and volume of the call 10 to reproduce sound emanating from all of the calls of a wild turkey. Further, the call is effective whether used by a novice or expert and expertise can be readily achieved.

While the turkey call 10 described with reference to the various embodiments is built principally of wood, the components of the call may be made of various materials including hard and soft wood, slate or synthetic material such as plastic. The shape can be varied as well as the size. While the call 10 illustrated in FIGS. 1–5 is approximately 5" in length, and about 2" in width, the size may be varied. The smaller the call, the higher the pitch of the sound generated, while a large call produces a relatively deep, coarse tone. As to the characteristics of the friction-type turkey calls, occasional sanding and chalking of the contact surfaces provides the needed maintenance to insure that proper sounds can consistently come from the call 10. Chalking the face 64 of the striker is sufficient under normal circumstances to maintain proper sound production.

It is important to note that the angle of the sounding board 24 also affects the type of sound which is produced. A sounding board set on a slight oblique angle perpendicular of the contact surface 64 of the striker produces a low tone sound, while the sounding board set at a steeper oblique angle produces a higher tone sound. In that regard, FIG. 6 illustrates a single sounding board call 10' which is identical to that at 10 in FIGS. 1–5 inclusive, with the exception that the sounding board 24' of box assembly 12 is at a steeper angle $\alpha'$ to a line 82 which is perpendicular to face 64 of striker 14. In the various embodiments illustrated and described, like numerals are employed for common elements.

Referring next to FIGS. 7, 8 and 9, a further embodiment of the invention employs the same basic components, the turkey call 10" having an elongated, generally rectangular, hollow wooden sound box assembly 12' with a central slot 32' formed by slightly different configured end blocks 26', 28' and a pair of identical sized, configured and obliquely positioned sounding boards 24 fixably mounted at opposite ends to respective end blocks 26', 28' at recesses 34. The striker 14 is of identical configuration to that of the prior embodiments, pivoted at one end to end block 28' via hinge 72' with depression of the striker 14 being resisted by return spring 16, FIG. 7. In FIGS. 8 and 9, the return spring 16 is purposely not illustrated, however, it is identically positioned and configured as that of the embodiment of FIGS. 1–5 inclusive and being mounted on the inside surface of end block 28' and centered beneath the pivotable striker 14. In this embodiment, there is no solid back panel, but rather the front wall 20 is repeated on both sides of the end blocks 26', 28', of the same height and configuration. In this case, a rectangular notch 90 is formed within the center of end block 28' at the top surface 58', further aligned holes as at 92 are drilled through the end block 28' horizontally and a similar diameter hole 74 is formed within striker 14, as per the first embodiment. The hinged pin 76 is mounted within the holes and forms a pivot 77' which permits oscillation of the striker 14, while being loosely held at one end within slot 90, so that selectively faces 64 and 66 in this case rub against contacting edge 24a of one or the other of the sounding boards 24. The same scalloping 24b, 24c is provided to the edge 24a of the sounding boards, respectively at opposite ends, thus an enlarged slot 32' opens to the sound chamber 30 of this friction, box-type call 10".

In the embodiment of FIGS. 7, 8 and 9, the oblique edge 36 of end block 26' is matched on the other side in this embodiment, so that both sounding boards 24 are at the same angle $\alpha$ and in this case, the gap or distance D which is formed between edges 24a of respective sounding boards 24, is slightly wider than the width of striker 14 which is interposed therebetween. As may be appreciated, the sounds emanating from the sound chamber 30 produced by sounding board 24, are of essentially the same tone due to the identical size of the sounding boards and their identical angulation with respect to opposed faces 64, 66 of the striker 14.

Reference to FIG. 10 wherein, again like elements bear like numeral designations and similar elements are given prime designations, the turkey call 10''', involves a pair of oppositely oblique sounding boards, in this case one at 24, mounted to front wall 20 and a second one at 24' mounted to a slightly different height vertical wall 20' whose upper edge is at a different angulation, likewise the end walls 26" as shown and the opposite end walls (not shown) have oblique edges 36, 36' which are at different angles $\alpha$ and $\alpha'$, respectively. In FIG. 10''', the only change from the embodiments of FIGS. 7, 8 and 9 is the angle of inclination of one of the sounding boards 24' relative to the other 24, in this case it is a hybrid of the embodiments of FIG. 6 and that of FIG. 7–9 inclusive. As seen in FIG. 10''', which is an end view from end block 26''', the oblique edge 36', recess 34 within end block 26" and the size and positioning of sounding board 24 is identical to that of the embodiment of FIG. 9 to the left of that Figure while, to the right recess 34' is differently configured since, oblique edge 36' is at a different angle $\alpha'$, thus providing a steeper pitch for sounding board 24'. Thus, while the dimension of gap D between opposing edges 24a, 24a' of sounding boards 24, 24' remains the same, as in the prior embodiment, edge 24a' is considerably above that of 24a for respective boards 24, 24'. The striker 14 is identical, and identically positioned and similarly spring biased in the manner of the embodiment of FIGS. 7-9 inclusive. The opposite end block (not shown) for the embodiment of 10''' is similarly configured, with the exception of course, that it has a notch for pivotably mounting of the striker 14 in the same manner as that shown in FIGS. 7 and 8. While the action is the same, however, the sound chamber 30'' is sized somewhat different, and as may appreciated, due to the steepness of sounding board 24', a higher pitch note emanates when face 66 of the striker 14 is rubbed against edge 24a' of sounding board 24' than when, the opposite face 64 of the striker is rubbed against edge 24a of sounding board 24. In this embodiment, therefore, there is a wider range of sound and, by displacing of the striker 14 to the right or left, the pitch of the sound can be readily changed providing greater versatility to the sounds emanating from the sound chamber 30'' in emulating the clucks, purrs, etc. of a natural wild turkey.

The two-sided call offers a greater variety in the range of sounds produced. The loose fit of the hinged mount for the striker 14 is purposely designed so that it can shift from side to side against either sounding board edge and with the angles of the two sounding boards 24, 24' being set differently, in the embodiment of FIG. 10''', there is provided a greater range of sound emanating from chamber 30'' in that embodiment.

In similar fashion to the turkey call of U.S. Pat. No. 4,343,108, the side walls of the sound box assembly for the various embodiments may be formed of Auderobia or Honduras or Philippine mahagoni or select red ceder. The end blocks and base or bottom 18 may be likewise formed of such woods. They also may be made of clear maple, oak, cap walnut or cherry. The joints between the walls should be of a tight fit, sealing the interior of the sound chamber with the exception of the elongated slot within which the striker oscillates. Changes may be made to the thickness and/or type of wood employed, particularly for the sounding boards to vary the tone of the sound emanated by the turkey call during use.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A compact, hand-held friction type turkey call comprising: a generally rectangular, elongated hollow wooden sound box assembly forming internally a sound chamber, a longitudinal slot within said sound box assembly, a striker, means for mounting said striker for movement into and out of said slot and having at least one planar surface, said hollow sound box including a sounding board oblique to said at least one planar surface of said striker, extending inwardly towards said striker planar surface and having a longitudinal edge contactable by said striker planar surface during movement of the striker into and out of said slot to cause a rasping sound to be developed within said sound chamber closely imitating that of a live wild turkey.

2. The turkey call as claimed in claim 1, further comprising spring biasing means carried by said sound box, operatively engaging said striker for resisting movement of said striker into said sound chamber so as to normally bias said striker into a position partially projecting out of said slot.

3. The turkey call as claimed in claim 1, wherein said striker is a planar member having parallel flat, opposed surfaces and wherein said means for mounting said striker on said sound box assembly comprises means for pivotably mounting one end of said striker for pivoting about an axis perpendicular to the longitudinal axis of said longitudinal slot.

4. The turkey call as claimed in claim 1, wherein said wooden sound box assembly comprises a horizontal base, laterally opposed vertical front and rear walls extending along opposite sides of the base and parallel to each other and opposed end blocks connected at opposite ends to respective ends of said base and said front and rear walls of the sound box assembly, said striker one end is pivoted to one of said end blocks for oscillation about a pivot axis perpendicular to the longitudinal axis of the slot and said biasing means comprises a return spring positioned within the sound box and contacting an edge of the striker projecting through said slot and into the sound chamber for biasing said striker to a position partially projecting outside of the sound box and outwardly of said longitudinal slot.

5. The turkey call as claimed in claim 4, wherein said return spring is a coiled wire spring having one leg fixably mounted to one of said end blocks, and a second leg at right angles thereto having a terminal portion in contact with the edge of the striker proximate to the sound chamber.

6. The turkey call as claimed in claim 4, wherein said at least one oblique sounding board comprises a sounding board fixed along a lower edge thereof to the edge of the front wall remote from the base and said sounding board projects towards the rear wall and away from the base and wherein, the rear wall is of a height in excess of the combined height of the front wall and the oblique sounding board and being spaced from the edge of the sounding board proximate to the striker by a distance which is slightly in excess of the width of the striker and wherein, said means for pivoting said striker is such that the striker is loosely pivoted to the end block such that the striker may shift laterally relative to the rear wall and the edge of the sounding board proximate thereto to cause a variance in the tone, pitch and volume of the sound produced by rubbing contact of the striker surface with the edge of the sounding board.

7. The turkey call as claimed in claim 6, wherein the sounding board has opposite longitudinal ends and the edge of the sounding board proximate to the striker is cut away at each longitudinal end thereof such that contact between the striker surface and the edge of the sounding board is limited to the center of the sounding board, thereby enlarging the longitudinal slot near opposite longitudinal ends thereof to improve the sound reproduction of the call sounds of a wild turkey.

8. The turkey call as claimed in claim 4, wherein said sound box assembly includes diagonally opposite dual sounding boards extending inwardly from opposite front and rear walls thereof and having opposing free edges defining said longitudinal slot of said sound box assembly whereby, the opposed surfaces of said striker may be placed in selective contact the respective edges of the dual sounding boards to vary the sound emanating from the sound chamber during striker movement into and out of the longitudinal slot.

9. The turkey call as claimed in claim 8, wherein the sound boards are at the same oblique angle relative to the opposed surfaces of the striker such that the sound produced by respective boards are generally of the same pitch and volume.

10. The turkey call as claimed in claim 8, wherein the sound boards of the sound box assembly are at different oblique angles relative to the opposed surfaces of the striker to produce varying pitch and volume sounds depending upon which of the opposite surfaces of the striker rubs across a respective contorting edge of the dual sounding boards.

* * * * *